Patented Mar. 18, 1941

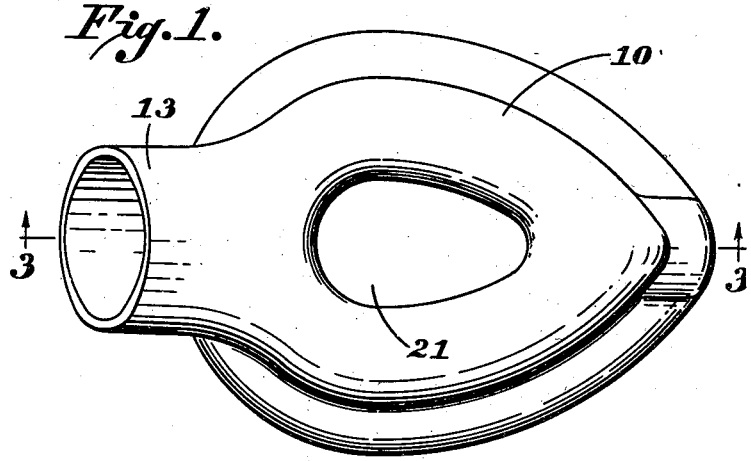
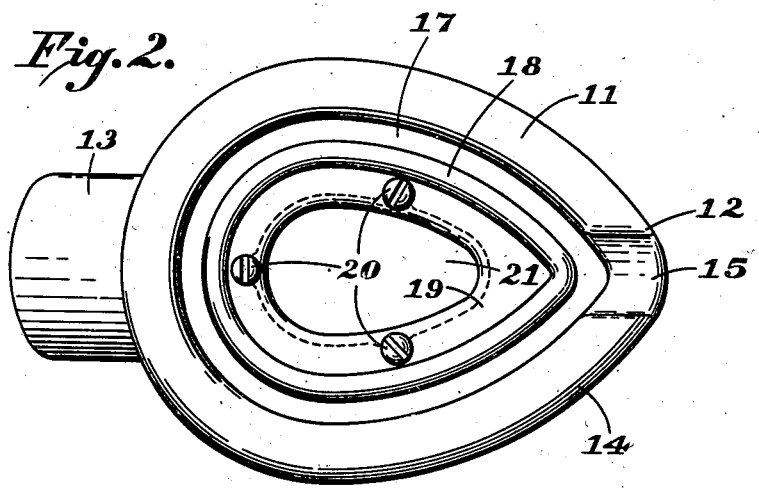
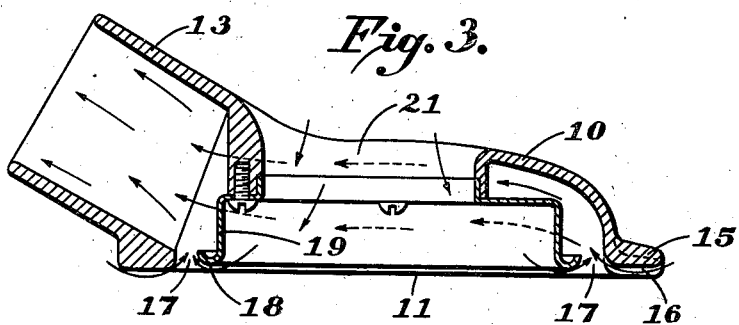

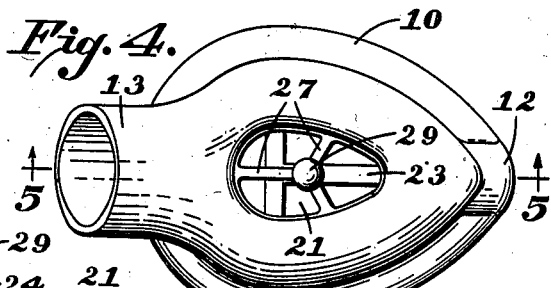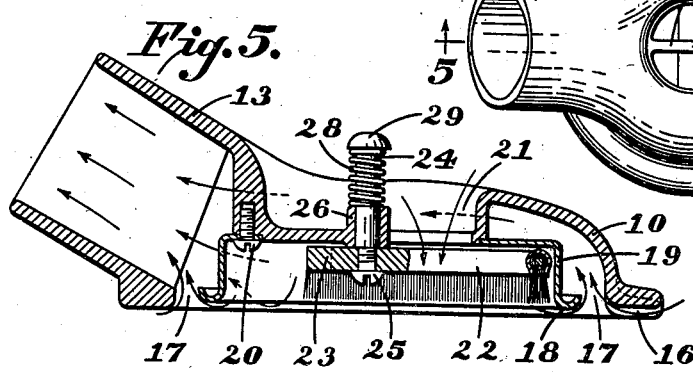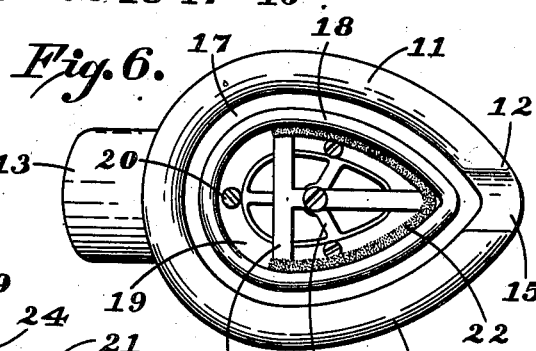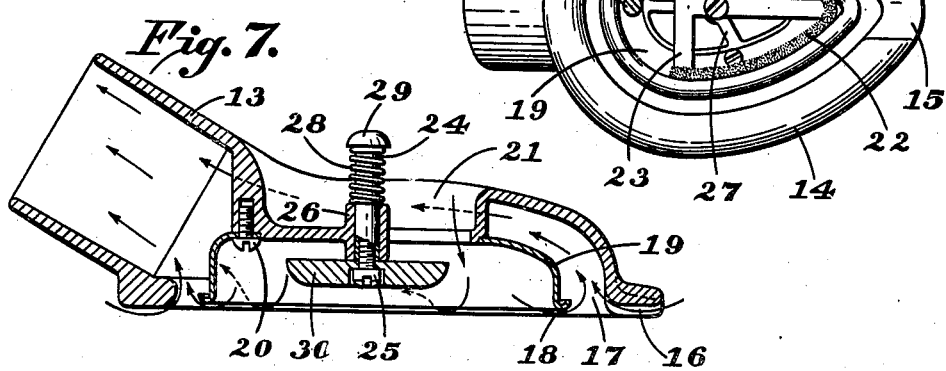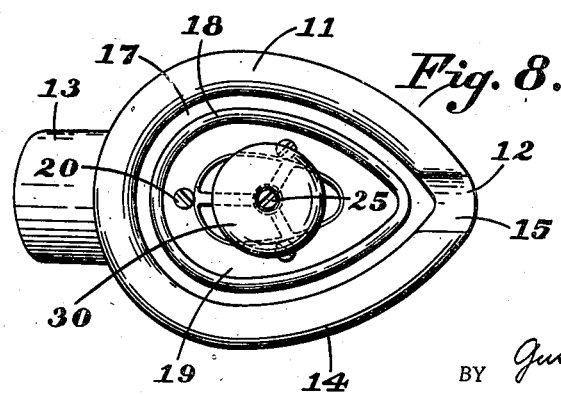

2,235,224

UNITED STATES PATENT OFFICE 2,235,224

SUCTION NOZZLE

Gustaf Einar Lofgren, Riverside, Conn., assignor to Electrolux Corporation, New York, N. Y., a corporation of Delaware Application July 11, 1939, Serial No. 283,767

7 Claims. (Cl. 15—158)

My invention relates to suction nozzles and more particularly to a suction nozzle for use with a vacuum cleaner.

In cleaning upholstered furniture, difficulty is frequently experienced in removing dirt from corners and crevices.

An object of my invention is to provide an improved suction nozzle particularly adapted for cleaning in confined spaces.

A further object of my invention is to provide a suction nozzle which will clean with equal facility regardless of the direction of movement of the nozzle.

What I consider to be novel and my invention may be better understood by reference to the following specification and appended claims when considered in connection with the accompanying drawings, in which—

Fig. 1 is a top view of one form of the nozzle;

Fig. 2 is a bottom view of the nozzle;

Fig. 3 is a sectional view taken along the line 3—3 of Fig. 1;

Fig. 4 is a top view of a modified form of the nozzle;

Fig. 5 is a sectional view taken along the line 5—5 of Fig. 4;

Fig. 6 is a bottom view of the nozzle as shown in Figs. 4 and 5;

Fig. 7 is a sectional view similar to Fig. 5, though a somewhat modified form of the nozzle; and Fig. 8 is a bottom view of the nozzle as shown in Fig. 7.

Referring to the drawings, 10 indicates a nozzle body having a substantially flat bottom or contact surface 11 with a pointed end 12. Body 10 is substantially hollow and is provided with a hollow conduit receiving extension 13. Extension 13 is adapted to be connected by means of a conduit to a source of suction, such as a vacuum cleaner.

Around the periphery of the bottom surface 11, a smooth outer lip 14 is provided having an arched portion 15 at the pointed end 12, forming a passage 16 communicating with a curved suction opening 17. Suction opening 17 is separated from the periphery of the bottom surface 11 by the lip 14. Suction opening 17 communicates with the interior of body 10 and the hollow extension 13. An inner lip 18, spaced inwardly from the plane of the outer lip 14, is formed in a separate plate 19, which is secured to body member 10 by means of screws 20. A passage 21 communicating with the atmosphere and the suction opening 17, across the inner lip 18, is formed centrally within body member 10.

When the nozzle body 10 is connected to a source of suction, air enters the interior of the body, as indicated by the arrows in Fig. 3. Air enters the suction opening 17 from the outside by passing through or over the surface with which the nozzle 10 is in engagement, across the outer lip 14. At the pointed end 12, a greater flow of air is permitted because of the passage 16 formed by the arched portion 15 of the lip 14. This facilitates the removal of the dirt in small and confined places with greater efficiency, because of the larger air flow permitted in this point. Additional air enters through the passage 21 and travels into the suction opening, across the lip 18. While the passage 21 provides a relatively confined space, as compared with the space around the outer lip 14, the resistance to air flow across the inner lip 18 is somewhat reduced by the spacing of the lip 18 inwardly from the plane of lip 14.

As the bottom surface 11 of nozzle body 10 travels over a surface being cleaned, air enters the suction opening 17 from all directions, opposed currents of air entering the suction opening 17 across the outer lip 14 and inner lip 18, thereby insuring a complete and efficient cleaning of the surface. Regardless of whether the nozzle 10 is moved forwardly, backwardly, or to either side, the nozzle will clean with substantially equal efficiency. Also, by virtue of the shape of the surface 11 with the pointed end 12, any type of surface, or any shape of corner can be efficient'y cleaned. In whatever direction the nozzle 10 is moved, the suction opening 17 travels across any particular point on the surface twice, even though the nozzle is moving continuously in one direction. For example, as the suction nozzle, as shown in Fig. 2, is moved to the right, the right hand portion of the suction opening 17 first travels across a particular point, and then upon a continued movement of the nozzle in the same direction, the left hand portion of the suction opening 17 will travel across the same point.

In Figs. 4, 5, and 6, a modified form of nozzle is shown with the same numerals used to indicate the parts similar to corresponding parts in the form shown in Figs. 1, 2, and 3. In this modified form, a brush 22 is mounted within passage 21. The brush 22 conforms to the shape of the inner lip 18 and extends adjacent to and along a portion of the lip 18. Brush 22 is mounted on a supporting structure 23, secured to a push rod 24 by means of a screw 25. Rod 24 is journalled in a bushing 26 formed integrally with the body 10 and secured in passage 21 by means of three radially extending arms 27. A compression spring 28 holds the brush 22 in an inactive position by engagement with the bushing 26 and a flange formed on a cap 29.

In cleaning upholstered furniture, the form of nozzle, shown in Figs. 4, 5, and 6, would be manipulated in the same manner as described above. If any light threads, dog hairs, or the like, tenaciously adhere to the surface being cleaned, they may be loosened by depressing the brush 22 by pressure applied to the cap 29 of the rod 24. After such material has been removed, the cap 29 will then be released and the cleaning continued in the usual manner.

In Figs. 7 and 8, another modified form of nozzle is shown, in which a plate 30 is substituted for the brush assembly 22 and 23 of Fig. 5. The plate 30 when depressed by the application of pressure to the cap 29 will serve to separate any relatively light material from the inner lip 18. In this manner, air can be caused to flow across the surface of the light material, instead of through it, as would be the case, if the material adhered tightly to the inner lip 18. The plate 30 is shown as circular, but any other shape desired may be substituted therefor. The plate 30 also serves to facilitate the cleaning of light materials by preventing too great a resistance to the movement of the nozzle across such materials.

My invention is not limited to the exact constructions, as shown by way of example, but may be modified within the scope of my invention as pointed out in the appended claims.

What I claim is:

1. A suction nozzle including a body member having a contact surface with a pointed end and a curved periphery with a suction opening substantially annular in shape adjacent its periphery, a smooth lip extending around the outside of said suction opening, and a smooth lip extending around the inside of said suction opening spaced inwardly from the plane of said first-named lip, said body member having an opening communicating with the atmosphere at one end and permitting air to flow into said suction opening across said inside lip, said first-named lip having an arched opening at the pointed end of the contact surface.

2. A suction nozzle including a body member having a contact surface with a suction opening substantially annular in shape adjacent its periphery, a smooth lip extending around the outside of said suction opening, a smooth lip extending around the inside of said suction opening, said body member having a passage communicating with the atmosphere at one end and with the suction opening only across said inside lip, an extension connected to said body member for connection to a source of suction and communicating with the interior of the body and with said suction opening and a brush secured within said passage positioned adjacent said inside lip.

3. A suction nozzle including a hollow body member having a flat contact surface and a central passage communicating with the atmosphere at one end, a plate secured to said body member within said central passage, and defining a suction opening substantially annular in shape in said contact surface adjacent the periphery thereof, and a brush located within said passage adjacent said suction opening.

4. A suction nozzle including a body member having a contact surface and a central passage therethrough communicating with the atmosphere at one end, a plate secured in the passage of said body member and defining a suction opening substantially annular in shape adjacent the periphery of the contact surface, a brush located within said passage adjacent said suction opening, a spring holding said brush in retracted position, and means to move said brush section to a position in engagement with a surface being cleaned.

5. A suction nozzle including a body member having a contact surface and a central passage extending therethrough communicating with the atmosphere at one end, a plate secured within the passage of said body member defining a suction opening adjacent the periphery of said contact surface and inclosing a suction chamber within said body member, a flat plate secured within said central passage, a spring normally holding said flat plate above the contact surface of said body member, and means to move said flat plate to the plane of said contact surface against the bias of said spring.

6. A suction nozzle including a body member, having a flat contact surface pointed at one end, spaced lips extending around the periphery of said contact surface forming a continuous suction opening substantially annular in shape, said body member having a passage communicating with the atmosphere at one end and with said suction opening across the inside lip, a brush located within said passage adjacent said suction opening, a rod connected to said brush and journalled in said body member, a spring engaging said rod to hold said brush in a normally retracted position, and means to move said brush against the bias of said spring.

7. A suction nozzle including a body having a pointed end with a suction opening extending from the pointed end along the periphery of the body, an outer lip for the suction opening extending along the periphery of said body, an inner lip for said suction opening spaced inwardly from the plane of said outer lip, said body member having a passage communicating with the atmosphere at one end and with the suction opening across said inner lip, and a member connected to the body member and communicating with the interior thereof for receiving a suction conduit.

GUSTAF EINAR LOFGREN.